United States Patent
Carlqvist et al.

(10) Patent No.: US 10,323,917 B2
(45) Date of Patent: Jun. 18, 2019

(54) FIN DEPLOYMENT MECHANISM FOR PROJECTILE AND METHOD FOR FIN DEPLOYMENT

(71) Applicant: BAE SYSTEMS BOFORS AB, Karlskoga (SE)

(72) Inventors: Lars-Åke Carlqvist, Karlskoga (SE); Pär Eriksson, Karlskoga (SE)

(73) Assignee: BAE SYSTEMS BOFORS AB, Karlskoga (SE)

( * ) Notice: Subject to any disclaimer, the term of this patent is extended or adjusted under 35 U.S.C. 154(b) by 464 days.

(21) Appl. No.: 15/028,317

(22) PCT Filed: Oct. 7, 2014

(86) PCT No.: PCT/SE2014/000125
§ 371 (c)(1),
(2) Date: Apr. 8, 2016

(87) PCT Pub. No.: WO2015/053679
PCT Pub. Date: Apr. 16, 2015

(65) Prior Publication Data
US 2016/0252333 A1    Sep. 1, 2016

(30) Foreign Application Priority Data
Oct. 10, 2013  (SE) ...................................... 1330122

(51) Int. Cl.
*B64C 5/12*    (2006.01)
*F42B 10/14*   (2006.01)
(Continued)

(52) U.S. Cl.
CPC ................ *F42B 10/14* (2013.01); *B64C 5/12* (2013.01); *F42B 10/50* (2013.01); *F42B 10/54* (2013.01); *F42B 10/64* (2013.01)

(58) Field of Classification Search
CPC ... B64C 5/12; B64C 5/06; F42B 10/14; F42B 10/26; F42B 10/50; F42B 10/54; F42B 10/64
See application file for complete search history.

(56) References Cited

U.S. PATENT DOCUMENTS 1,302,008 A    4/1919  Cameron
4,113,204 A    9/1978  Leek
(Continued)

FOREIGN PATENT DOCUMENTS

GB         2121147 A       12/1983
WO    WO-2008143707 A2 *  11/2008  .............. F24B 10/14

OTHER PUBLICATIONS

Supplementary European Search Report dated Apr. 19, 2017 in Patent Application No. 14 85 2587.
(Continued)

*Primary Examiner* — Richard R. Green
(74) *Attorney, Agent, or Firm* — Jeffri A. Kaminski; Venable LLP

(57) ABSTRACT

A fin deployment mechanism for a projectile. The mechanism includes at least one fin and at least one actuator. The fin is arranged in a deployable and retractable manner on the projectile. The fin and at least one balance weight are arranged so that, when the fin is deployed, the weight is displaced towards a center of the projectile and, when the fin is retracted, the weight is displaced from the center of the projectile. A method for deploying and retracting fins on a projectile. At least one fin is arranged in a deployable and retractable manner on the projectile. The fin is fitted to at least one balance weight such that when the fin is displaced from the center of the projectile the weight is displaced
(Continued)

Figure 1:
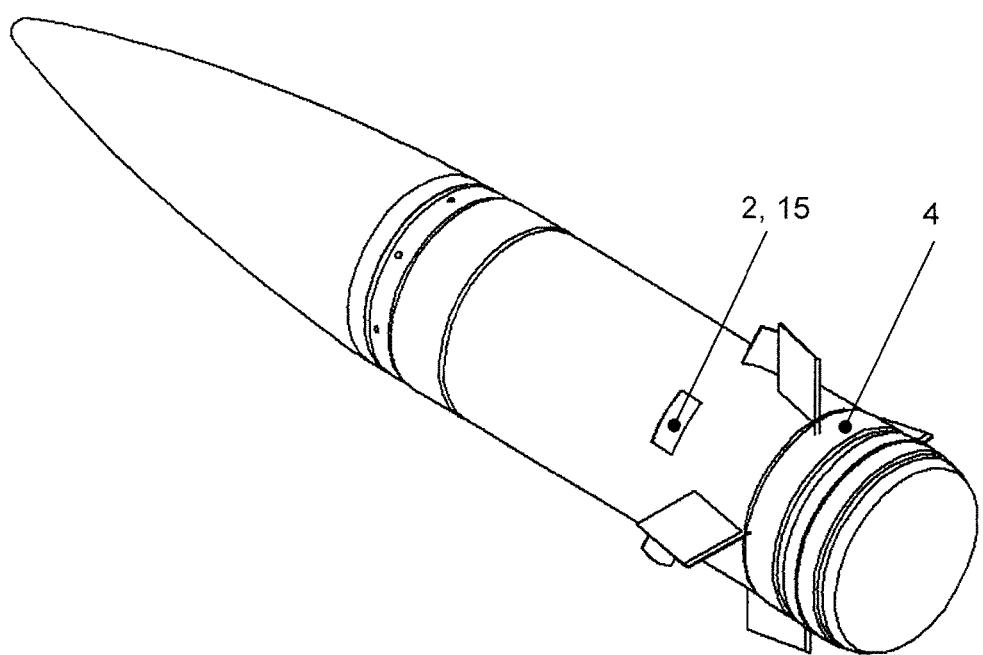

towards the center, and when the fin is displaced towards the center of the projectile the weight is displaced from the center.

15 Claims, 6 Drawing Sheets

(51) Int. Cl.
*F42B 10/50* (2006.01)
*F42B 10/54* (2006.01)
*F42B 10/64* (2006.01)

(56) References Cited

U.S. PATENT DOCUMENTS

| | | | |
|---|---|---|---|
| 4,817,891 A | | 4/1989 | Gaywood |
| 4,844,386 A | | 7/1989 | Brieseck |
| 5,074,493 A | | 12/1991 | Greenhalgch |
| 5,816,531 A | | 10/1998 | Hollis et al. |
| 7,163,176 B1 | | 1/2007 | Geswender et al. |
| 9,989,338 B2 | * | 6/2018 | Osdon .................. F42B 10/16 |

OTHER PUBLICATIONS

PCT/ISA/210—International Search Report—dated Jan. 20, 2015 (Issued in Application No. PCT/SE2014/000125).
PCT/ISA/237—Written Opinion of the International Search Authority—dated Jan. 20, 2015 (Issued in Application No. PCT/SE2014/000125).

* cited by examiner

FIN DEPLOYMENT MECHANISM FOR PROJECTILE AND METHOD FOR FIN DEPLOYMENT

CROSS-REFERENCE TO RELATED APPLICATIONS

This application claims priority to Swedish patent application 1330122-1 filed 10 Oct. 2013 and is the national phase under 35 U.S.C. § 371 of PCT/SE2014/000125 filed 7 Oct. 2014.

TECHNICAL FIELD

The present invention relates to a fin deployment mechanism for a rotationally stabilized projectile, comprising at least one fin and at least one actuator. The invention also relates to a method for energy-efficient deployment and retraction of fins on a rotating projectile.

BACKGROUND TO THE INVENTION, PROBLEM DEFINITION AND PRIOR ART

Rotationally stabilized projectiles are corrected in their path, from launcher to target, for example by the deployment and retraction of guide fins and/or brake flaps during travel of the projectile in its path. One problem is the high energy consumption which is incurred when the fins (brake and rotation fins or other fins) frequently need to be deployed and retracted during travel of the projectile from launcher to target.

The target precision for a projectile in an artillery system is largely controlled by meteorological aspects and how closely the actual launch velocity, V0, matches the calculated launch velocity, as well as by launcher-related factors, such as the configuration of the barrel and the exactness of the aiming system. Before guidable projectiles began to be used in artillery applications, there was no possibility of affecting the trajectory of the projectile after the projectile had left the barrel.

Through the introduction of guide mechanisms, such as rudders, flaps or fins/wings, the guidability of a projectile is able to be controlled. Depending on the configuration, placement and size of the fins/wings, various degrees of dirigibility can be obtained. Different dirigibilities are required, depending on the configuration, V0, firing range, altitude and target precision of the projectile. Reliable techniques have also been developed for calculating the current position of a projectile, based on inertial navigation and/or satellite navigation via a GNSS system, such as, for example, GPS. Projectiles are also constructed with a GNC system and the GNSS system can be said to be a part of the GNC system. GNC, which stands for Guidance, Navigation and Control, ensures that the projectile is guided towards the target for which the projectile is meant.

One specific guidance method for projectiles requires that fins, such as brake flaps and rotation fins, are frequently deployed and retracted from the projectile during travel of the projectile from launcher to target. With currently known design solutions, the energy consumption will be very high, especially when the fins are retracted from the deployed position, since a large, centrifugally created force must be overcome.

GB 2,121,147 A describes a fin deployment mechanism for a missile in which fins are mounted, with lever arms and pivot pins, against an inner part arranged in a rotatably concentric manner relative to the cylindrical missile. The device is spring-loaded and the fins are deployed after a locking mechanism releases the inner part, which, through a rotary motion, deploys the fins. No radial motion for deployment of the fins is described, nor retraction of the fins, or that the inner part is adapted to constitute a counterweight or to otherwise reduce the energy consumed in the deployment operation.

One problem with known constructions of fin deployment mechanisms is that the energy which is used to deploy and, above all, retract the fins is large.

Another problem with known constructions of fin deployment mechanisms is that a powerful motor or a powerful servo is needed to retract or deploy the fins. A powerful motor/servo consumes large quantities of energy and takes up a large amount of space in the projectile.

A further problem with the said projectile constructions is that energy sources in the form of batteries or other energy-storing methods are bulky, are prone to ageing, or are for other reasons unsuitable for integration on projectiles. There is therefore a desire to reduce the size of the energy sources or wholly avoid energy sources.

Further problems which the invention aims to solve emerge in connection with the following detailed description of the different embodiments.

OBJECT OF THE INVENTION AND ITS DISTINGUISHING FEATURES

One object of the present invention is a fin deployment mechanism with improved energy efficiency.

A further object of the present invention is an improved method for fin deployment with improved energy efficiency.

According to the present invention, an improved fin deployment mechanism for a rotationally stabilized projectile, comprising at least one fin and at least one actuator, has been provided, in which the projectile is characterized in that the fin is arranged in a deployable and retractable manner on the projectile, and in that the fin and at least one balance weight are mechanically arranged so that, when the fin is deployed by the actuator, then the balance weight is displaced in towards the centre of the projectile and, when the fin is retracted by the actuator, then the balance weight is displaced out from the centre of the projectile.

According to further aspects of the fin deployment mechanism according to the invention:

the displacement of the fin is a displacement in the radial direction of the projectile, and the opposite displacement of a balance weight is a displacement in the radial direction of the projectile, the total mass of the balance weight increases when the number of balance weights increases, since the balance weights are displaced in towards the centre of the projectile at the same time as the fin is deployed from the projectile, the total mass of the balance weight decreases when the number of balance weights decreases, since the balance weights are displaced out from the centre of the projectile at the same time as the fin is retracted into the projectile, the number of balance weights is three, in which one balance weight is fixedly mounted against the slide, and in which, furthermore, firstly a balance weight, and thereafter a further balance weight, are displaced when the slide is displaced in towards the centre of the projectile, the fin and the balance weight are fitted to a rotatable disc, in which rotation of the disc in a first direction causes the fin to be deployed from the projectile and the balance weight to be displaced in towards the centre of the projectile, and rotation of the disc in a second direction, in which the second direction is the opposite direction to the first direction, causes the fin to be retracted into the projectile and the balance weight to be displaced out from the centre of the projectile.

In addition, according to the present invention, an improved method for energy-efficient deployment and retraction of fins on a rotating projectile is provided.

The method is characterized in that at least one fin is arranged in a deployable and retractable manner on the projectile, and in that the fin is fitted to at least one balance weight according to: (a) when the fin is displaced out from the centre of the projectile, upon deployment of the fin, the balance weight is displaced in towards the centre of the projectile, (b) when the fin is displaced in towards the centre of the projectile, upon retraction of the fin, the balance weight is displaced out from the centre of the projectile.

According to further aspects of the method, according to the invention:

the displacement of the fin is a displacement in the radial direction of the projectile, and the opposite displacement of a balance weight is a displacement in the radial direction of the projectile, the deployment force acting on the fin, $F_1$, is compensated with an equally large and equidirectional radial force acting on the balance weight, $F_2$, by virtue of the fact that the mass of the balance weight increases when the balance weight is displaced in towards the centre of the projectile and the mass of the balance weight decreases when the balance weight is displaced out from the centre of the projectile, fins and balance weights are fitted to a rotatable disc constructed with grooves, in which the grooves displace fins and balance weights when the disc is rotated, and in which the deployment force acting on the fin, $F_1$, is compensated with an equally large and equidirectional radial force acting on the balance weight, $F_2$, by virtue of the fact that the torque contribution on the rotatable disc from fins and balance weights, when the projectile is subjected to centrifugal acceleration, is balanced by the construction of the groove which displaces the balance weights and the grooves which displace the fins.

Advantages and Effects of the Invention

The invention solves the problem of high energy consumption upon deployment and retraction of fins/flaps in a rotationally stabilized projectile, through the use of balanced counterweights.

LIST OF FIGURES

Figure 2:
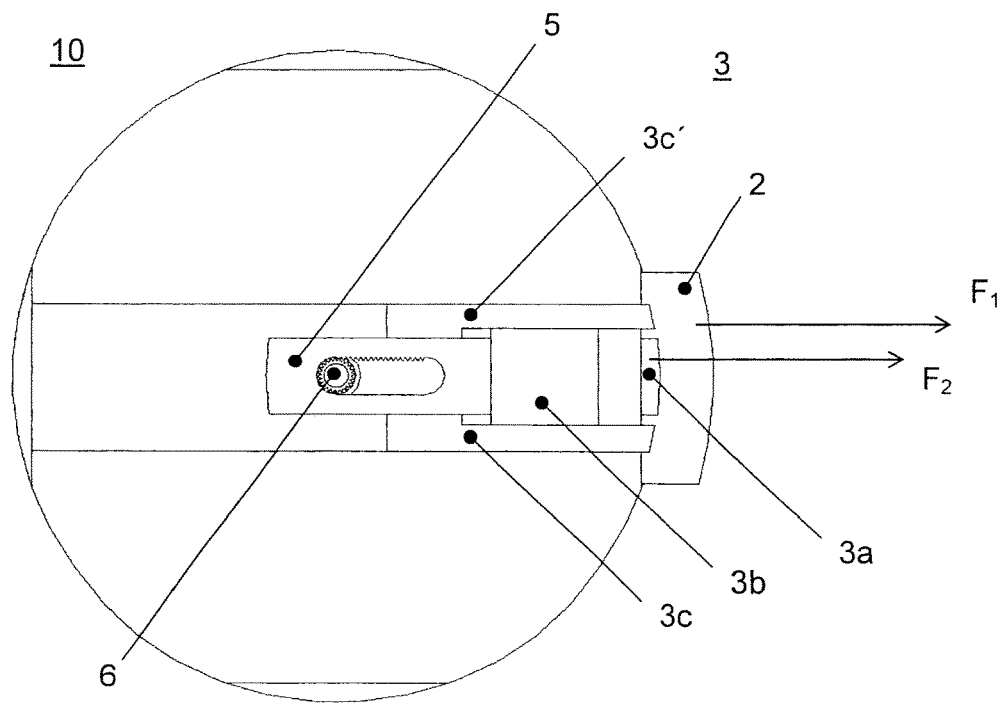
Figure 3:
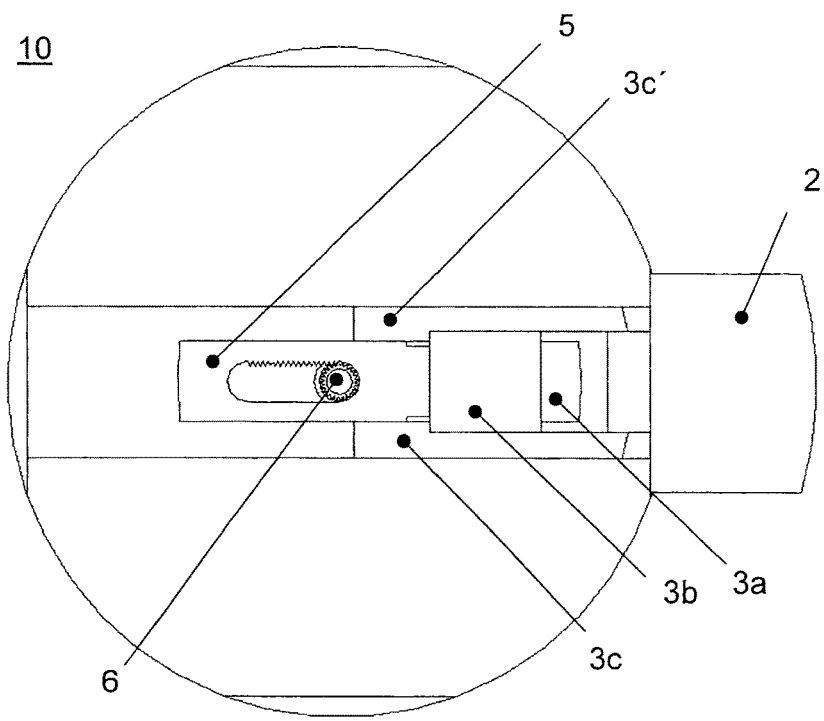
Figure 4A:
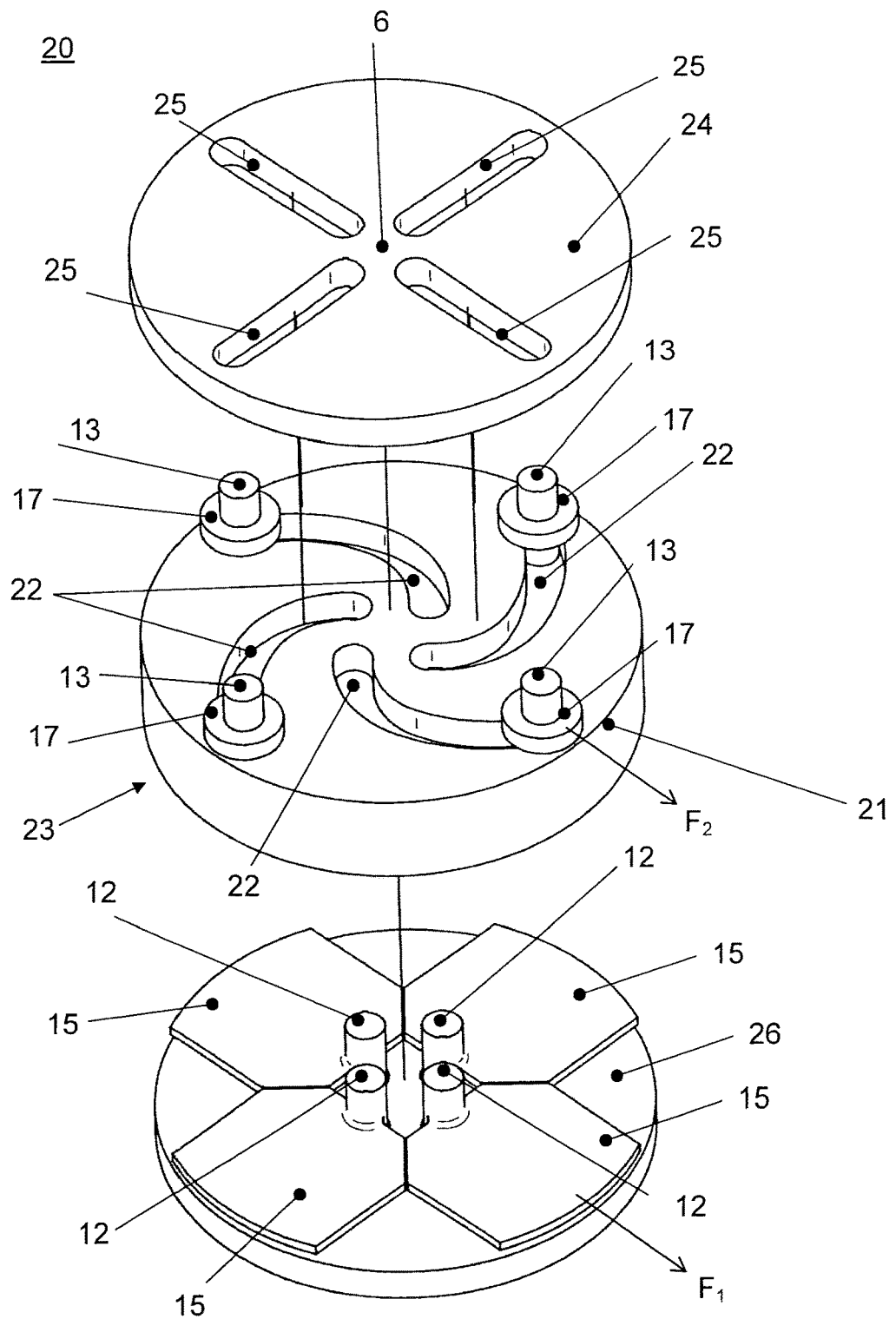
Figure 4B:
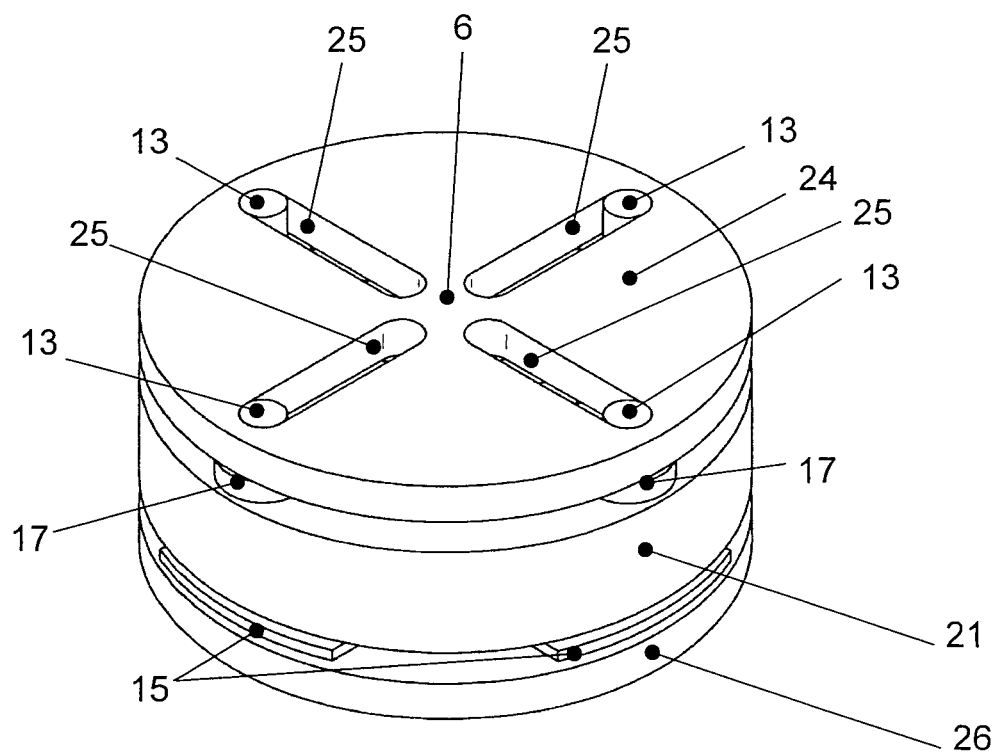
Figure 5A:
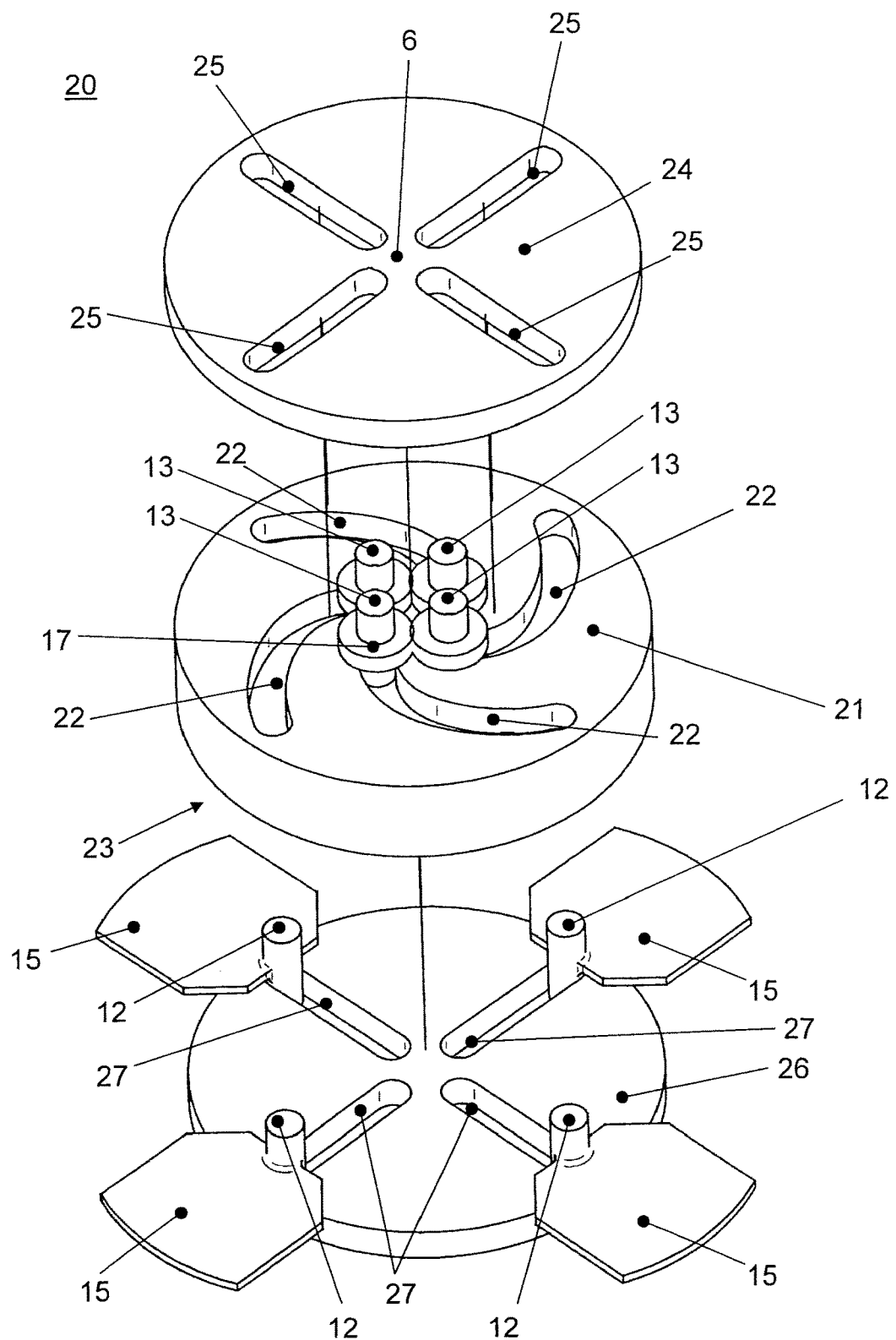
Figure 5B:
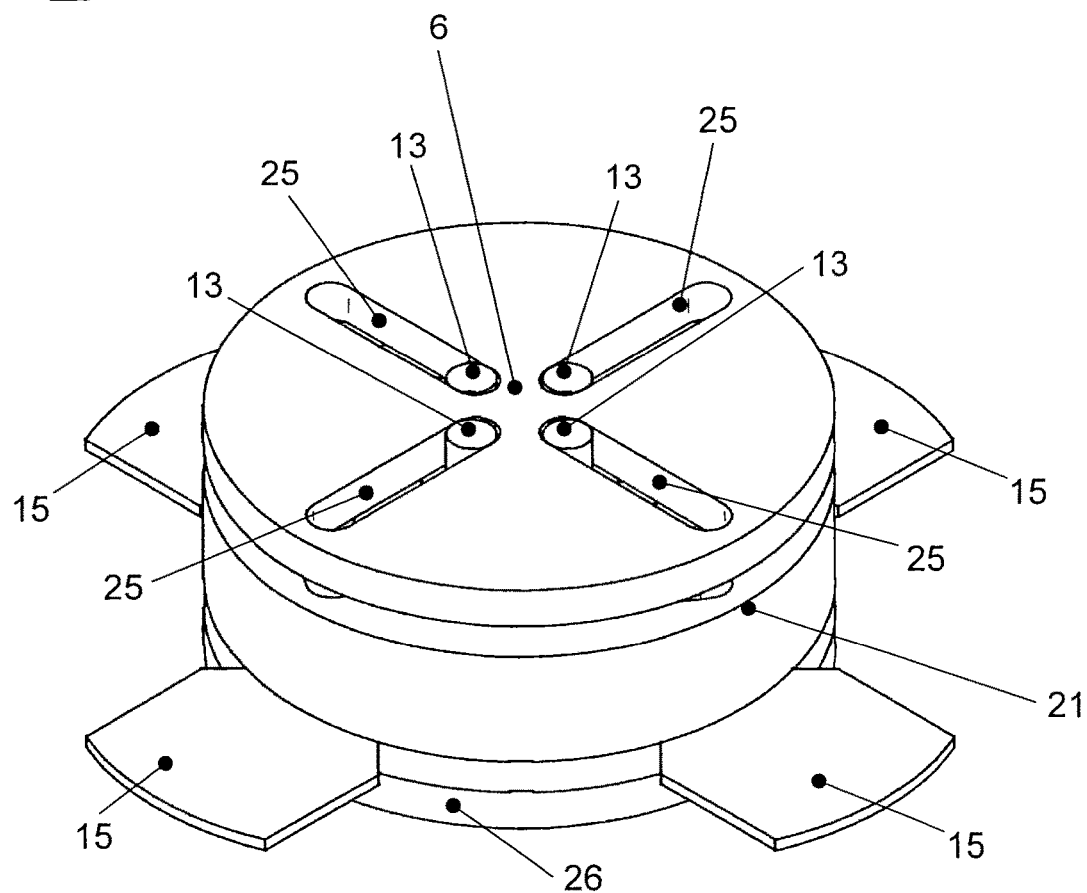

The invention will be described in greater detail below with reference to the appended figures, in which:

FIG. 1 shows a view from the side of a projectile according to one embodiment of the invention, FIG. 2 shows a cross-sectional view of a projectile over a fin deployment mechanism with the fins retracted, according to a first embodiment of the invention, FIG. 3 shows a cross-sectional view of a projectile over a fin deployment mechanism with the fins deployed, according to a first embodiment of the invention, FIG. 4a shows a view over an exploded diagram of a fin deployment mechanism with the fins retracted, according to a second embodiment of the invention, FIG. 4b shows a view over a fin deployment mechanism with the fins retracted, according to a second embodiment of the invention, FIG. 5a shows a view over an exploded diagram of a fin deployment mechanism with the fins deployed, according to a second embodiment of the invention, FIG. 5b shows a view over a fin deployment mechanism with the fins deployed, according to a second embodiment of the invention.

DETAILED DESCRIPTION OF EMBODIMENTS

The invention relates to an energy-saving fin deployment mechanism for deployment and retraction of fins. The fin deployment mechanism, by virtue of its construction with balance weights, has improved energy efficiency compared with traditional deployment methods without balance weights.

The fins, and thus the fin deployment mechanism, are preferably suited to a rotationally stabilized projectile. The fin deployment mechanism can be used for all types of fins, flaps, baffles, rudders or other guide members, also referred to as fins, in which the fins are substantially adjusted by radial maneuvering. The principle of balance weights can also be used in axial fin deployment. The fins can be both guiding and braking. The fin deployment mechanism is applicable to both fixed fins and fins which are controllable, rotatable or adjustable.

The fins are maneuvered in the radial direction of the fin deployment mechanism with one or more movably arranged balance weights, or counterweights, which move synchronously in the opposite direction to the fin which is deployed from the projectile. The method means that the forces on the fins during deployment and/or retraction, which forces are generated by the centrifugal acceleration, can be wholly or partially balanced out, which means that a significantly smaller quantity of energy is needed to manoeuvre the fins, and that a smaller motor can be used for deployment and retraction of the fins. The fins, as well as the balance weights, are acted on by a control gear or actuator arranged in the projectile, which can be constituted by a motor or a servo or some other mechanical, electrical or electromechanical device.

In FIG. 1 is shown a projectile 1 constructed with an energy-saving fin deployment mechanism, with both guide fins and brake fins provided. The number of fins 2 can vary in dependence on the purpose and object of the projectile 1. For example, fins 2 can be arranged to guide the projectile 1, but also to brake the projectile 1. Fins 2 can also be arranged to act as wings in order to give lifting force to a projectile 1 or to reduce or increase the rotation of a projectile 1 or a part of the rotation of a projectile 1, such as, for example, a rotating middle section. That embodiment of the projectile 1 which is shown in FIG. 1 has 8 fins in total, of which four are brake flaps and four are guide fins/rotation fins. The projectile 1 can be constructed with a girdle 4, which, during the launch process of the projectile, engages on the rifling of the barrel and thus rotates the projectile 1. The girdle 4 also has the purpose of protecting the fin deployment mechanism from gunpowder gases during the launch process, which means that it is advantageous if the fin deployment mechanism is placed in front of the girdle viewed from the rear section of the projectile.

A first embodiment of a projectile 1 in cross section with a fin deployment mechanism 10 is shown in FIG. 2. The fin deployment mechanism 10 comprises a gearwheel-driven balance weight/counterweight 3, in the form of a slide 5. In addition there is a slide (not shown in the figure), which is fitted to a fin 2 for radial maneuvering of a fin 2 during deployment and retraction. When the slide 5 is displaced, the slide (not shown) to which the fin 2 is fitted will move in the opposite direction. The slide to which the fin 2 is arranged is, in FIG. 2, placed behind and concealed by the slide 5.

The balance weights 3 can be constituted by a balance weight or a number of interacting balance weights. In one embodiment, as is shown in FIG. 2, the slide 5 is constructed with three balance weights 3a, 3b, 3c and 3c', which are coupled to the slide 5, in which the balance weights 3 move linearly and synchronously in the opposite direction to the fin 2 when this is deployed or retracted from the projectile 1. The balance weights 3c and 3c' are coupled together in a common structure, but can also be separated if the design so requires. In the centre 6, or close to the centre, of the projectile is arranged the motor, which drives the slide 5 and the slide to which the fin 2 is fitted. When the motor shaft, according to FIG. 2, is rotated anti-clockwise, the balance weights 3 will move in towards the centre 6 of the projectile and the fin 2 will be deployed from the projectile. The motor shaft which is located in the centre 6 of the projectile 1 can be directly connected to a motor or a servo. In addition, a gearbox or other transmission device can be arranged between the motor and the shown motor shaft. The motor shaft is preferably connected to the slide 5 by gearwheels, alternatively the motor shaft can be connected to the slide with a friction coupling or other coupling.

In FIG. 3 is shown the fin deployment mechanism 10 when the fin 2 is deployed. When the actuator, on the basis of FIG. 3, is rotated anti-clockwise, the slide 5, and thus the balance weights 3, will move out from the centre 6 of the projectile 1 and the fin 2 will be retracted into the projectile 1.

As a result of the design of the fin deployment mechanism, the fin 2 can be placed in intermediate positions between wholly retracted and fully deployed, that is to say that the fin 2 can be placed in a position where the fan is partially deployed.

In the second embodiment of the invention, which is shown in FIG. 4a, the fin deployment mechanism 20 comprises a rotatable disc 21 configured to, by a screwing or rotary motion, displace fins 15 respectively in and out, in which the fins 15 are arranged on mounted shaft journals 12, which move in semi-circular grooves 23 milled out on one side of the rotatable disc 21. The shaft journals 12 are also arranged to run in grooves 27 on a lower mounting disc 26. Correspondingly, semi-circular milled-out grooves 22 are arranged on the other side of the rotatable disc 21, where shaft journals 13 fitted to balance weights 17 move in the opposite radial direction to the fins 15. The shaft journals 13 are also arranged to run in grooves 25 in an upper mounting disc 24. In FIG. 4a, the fins 15 are retracted. The lower mounting disc 26 and the upper mounting disc 24 are constructed to guide the motion of the shaft journals 12, 13 when the rotatable disc 21 displaces the fins 15 and the balance weights 17 between the deployed and the retracted position. A groove 22, which is constructed on the rotatable disc 21, is preferably realized in the form of a circular segment. In one construction, the groove 22 is realized in the form of a quarter-circle, whilst other conceivable constructions are different forms of exponential, elliptical or other forms of groove to enable equivalent force distribution between the forces acting on the fins 15 and the forces acting on the balance weights 17. A groove 23, which is not clearly shown in the figures, is a mirror image of the groove 22, but is otherwise identical with the groove 22.

FIG. 4a shows an exploded diagram of the fin deployment mechanism 20. A mounted fin deployment mechanism 20 of the second embodiment with the fins retracted is shown in FIG. 4b.

FIG. 5a shows the fin deployment mechanism 20 after fin deployment according to the second embodiment of the fin deployment mechanism 20. The rotatable disc 21 has been rotated anti-clockwise through approximately 90 degrees, the direction in which the disc 21 has been rotated and the angle at which the disc 21 has been rotated being able to be freely varied and adapted for the projectile. Following the rotation, the mounted shaft journals 12 for the fins 15 have moved from a position in which the fins were retracted to a position where the fins 15 are deployed. The balance weights 17 have been displaced, with the mounted shaft journals 13, in towards the centre 6 of the projectile. The grooves 23 for the mounted shaft journals 12 for the fins and the grooves 22 for the mounted shaft journals for the balance weights 17 are constructed to balance the forces during retraction and deployment of the fins 15.

FIG. 5a shows an exploded diagram of the fin deployment mechanism 20. A mounted fin deployment mechanism 20 of the second embodiment with the fins deployed is shown in FIG. 5b.

Functional Description

Upon launch of the projectile 1 from a barrel, the projectile 1 leaves the barrel mouth rotatingly. The projectile 1 is rotationally stabilized in the path from launcher to target. During the launch phase, the fins 2, 15 have been protected by the girdle 4 from gunpowder gases and gunpowder particles. At a suitable moment or distance in the path of the projectile 1, the fins 2, 15 are deployed from the projectile 1. On the basis of the current position and velocity of the projectile 1 and the position of the target, the GNC system contained in the projectile decides how the projectile 1 should be guided in order to hit the target. Depending on the deviation of the projectile 1 from a desired course or direction in order to hit the target, the projectile 1 can be guided in differently large measure to ensure that the projectile 1 hits the target.

According to the first embodiment, when the fins 2 are deployed at least one balance weight 3 will be displaced counter to the direction of the fins 2, that is to say that the balance weights 3 move radially or otherwise in towards the centre 6 of the projectile when the fins 2 move out from the centre 6.

During deployment, centrifugal forces will act on the fins 2 with a deployment force. The centrifugal force acts also on the balance weight 3 and thus constitutes a force counter-directional to the force generated by the motor, in the centre 6 of the projectile, and acting on the slide 5, which force displaces the balance weight 3 in towards the centre 6 of the projectile. In the same way, when the fins are retracted, at least one balance weight 3 will be displaced in the direction of the fins 2, that is to say that the balance weights 3 move radially out from the centre 6 of the projectile 1 when the fin 2 moves in towards the centre 6 of the projectile 1. During retraction, centrifugal forces will act on the fins 2 with a force out from the centre 6 of the projectile 1. The centrifugal force acts also on the balance weight 3 and thus constitutes a force in the same direction as the actuator-generated force acting on the slide 5, which force displaces the balance weight 3 out from the centre 6 of the projectile 1. During deployment, there is a centrifugally acting force on the fin 2, which force contributes to the deployment of the fin 2. In the same way, during retraction, there is a centrifugally acting force on the balance weight 3, which force helps to move the balance weight 3 out from the centre 6. By balancing the centrifugally generated force component acting on the fins 2 with the centrifugally generated force component acting on the balance weights 3, a balanced fin deployment mechanism 10, 20 can be produced. Balancing takes place on the basis that the mass and placement of the balance weights 3 and the construction of the fin 2 and of the balance weights 3 are chosen on the basis of the design rules given by the rotation velocity and the fin design. The centrifugally acting force on the balance weights 3, as well as on the fins 2, is proportional to the distance from the centre of mass of the balance weights/fins to the centre 6 of the projectile 1. When the centre of mass is closer to the centre 6 of the projectile 1, the force acting on the mass is less than if a corresponding mass is at a greater distance from the centre 6. The force acting on the balance weight thus decreases when the balance weight 3 nears the centre 6 of the projectile. By increasing the mass of the balance weight when the balance weight 3 is displaced towards the centre, a corresponding force, $F_2$, is created/increased, which force is in the order of magnitude of the force $F_1$ acting on the fin 2.

In the proposed first embodiment of the fin deployment mechanism 10 according to FIG. 2 and FIG. 3, the balance weight 3a, when the fin 2 is deployed, will initially move radially in towards the centre 6 of the projectile. When the balance weight 3a, and thus the fin 2, has reached a certain predetermined point, the weight 3b will also be acted on by the slide 5. In this position, the balance weights consist of balance weight 3a and 3b. At a further point closer to the centre of the projectile, when the balance weight 3a and 3b, and thus the fin 2, has reached a certain predetermined point, the weight 3c and 3c' will also be acted on by the slide 5. In this position, the balance weights 3 consist of balance weight 3a, 3b, 3c and 3c'. In this embodiment, three balance weights 3 are therefore present, while both more and fewer balance weights 3 are conceivable for realizing a functional fin deployment mechanism 10. In an advantageous embodiment, $F_2$ is equal to or in the order of magnitude of $F_1$, for example by virtue of the fact that the mass of the balance weight 3 constantly increases when the balance weight 3 nears the centre 6 of the projectile. When the fin 2 is wholly retracted, the counterweights 3b, 3c and 3c' are in a rest position, where they bear against a fixed structure in the projectile 1, and when the slide 5 moves in towards the centre 6 firstly the balance weight 3b, and thereafter the balance weight 3c and 3c', will be displaced towards the centre 6 of the projectile 1.

In the proposed second embodiment of the fin deployment mechanism 20 according to FIG. 4a, 4b and FIG. 5a, 5b, the balance weights 17 will be displaced in towards the centre 6 of the projectile, at the same time as the fins 15 move out from the centre 6 of the projectile 1 through rotation of a disc 21. The grooves 22, 23 for the mounted shaft journals 12 for the fins 15 and the mounted shaft journals 13 for the balance weights 17 should be constructed so that the forces F1 acting on the fins 15 and the forces F2 acting on the balance weights 17 are of an equivalent order of magnitude during the deployment process and the retraction process. When the disc 21 is rotated, then grooves 22 will bring about a change in the potential energy for the fin 15, and by constructing grooves 23 such that the potential energy for the balance weight 17 is changed identically or almost identically to how the potential energy for the fin 15 is changed, a balance of the force $F_1$ acting on the fin and the force $F_2$ acting on the balance weight can be achieved. A motor or a servo is connected to the disc 21 and rotates the disc 21. The fins 15 can be displaced from wholly retracted to wholly deployed, and all intermediate positions. The shaft journals 12 which are mounted on or otherwise fitted to the fins 15 are guided by grooves 23 constructed in a lower mounting disc 26. In the same way, grooves 25 are arranged in an upper mounting disc 24 for guidance of the shaft journals 13 fitted to the balance weights 17. The upper mounting disc 24 and the lower mounting disc 26 can also be constructed such that a shaft or some other device for rotation of the disc 21 can be fitted to the disc 21. The upper mounting disc 24 and the lower mounting disc 26 can also be constructed to enable mounting of the fin deployment mechanism 20 in the projectile 1.

The radial deployment force acting on the fin 15, $F_1$, is compensated with an equally large and equidirectional radial force acting on the balance weight 17, $F_2$, by virtue of the fact that the torque contribution on the rotatable disc 21 from fins 15 and balance weights 17, when the projectile 1 is subjected to centrifugal acceleration, is balanced as a result of the construction of the groove 22, which displaces the shaft journals 13 fitted to the balance weights 17, and the groove 23, which displaces the shaft journals 12 fitted to the fins 15. An advantageous construction of the groove 22 is a circular segment, preferably a quarter-circle, while the groove 23, which is arranged on the opposite side of the rotatable disc 21, is arranged in mirror image to the groove 21, but otherwise identically.

Illustrative Embodiment

One example in which the fin deployment mechanism can be used is for a rotationally stabilized projectile in the form of an artillery shell having an outer diameter on the projectile of 155 mm and having a length on the projectile in the order of magnitude of 30-100 cm with a number of retractable and deployable fins, in which the fin deployment mechanism reduces the energy consumption during retraction and deployment of the fins during travel of the projectile from the launcher to the target of the projectile.

Alternative Embodiments

The invention is not limited to the shown embodiments, but can be varied in different ways within the scope of the patent claims.

It will be appreciated, for example, that the number, size, material and shape of the elements and components incorporated in the projectile are adapted according to the weapon system(s) and miscellaneous design characteristics which are present at the time.

It will be appreciated that the above-described fin deployment mechanism for a projectile can be adapted for different dimensions and projectile types, depending on the field of application and barrel width, but also for missiles, rockets or other aircraft.

The invention claimed is:

1. A fin deployment mechanism for a rotationally stabilized projectile, the fin deployment mechanism comprising:
    at least one fin;
    at least one balance weight; and
    at least one actuator configured to actuate the at least one fin, wherein the fin is arranged in a deployable and retractable manner on the projectile, and wherein the fin and the at least one balance weight are mechanically arranged so that, when the fin is deployed by the actuator, the balance weight is displaced in towards a center of the projectile, and when the fin is retracted by the actuator, the balance weight is displaced out from the center of the projectile, and a displacement of the fin is a translation in a radial direction of the projectile, and an opposite displacement of a balance weight is a translation in the radial direction of the projectile, and wherein a radial deployment force acting on the fin is compensated with an equally large and equidirectional radial force acting on the balance weight.

2. The fin deployment mechanism for a rotationally stabilized projectile according to claim 1, wherein a total mass of the at least one balance weight increases when a number of balance weights increases, since the at least one balance weight is displaced in a direction towards the center of the projectile at a same time as the at least one fin is deployed from the projectile.

3. The fin deployment mechanism for a rotationally stabilized projectile according to claim 1, wherein a total mass of the at least one balance weight decreases when a number of balance weights decreases, since the at least one balance weight is displaced out from the center of the projectile at a same time as the at least one fin is retracted into the projectile.

4. The fin deployment mechanism for a rotationally stabilized projectile according to claim 1, wherein a number of balance weights is three, the fin deployment mechanism further comprising:
a slide again which one balance weight is fixedly mounted, wherein a second balance weight, and thereafter a third balance weight, are displaced when the slide is displaced in towards the center of the projectile.

5. The fin deployment mechanism for a rotationally stabilized projectile according to claim 1, further comprising:
a rotatable disc to which the at least one fin and the at least one balance weight are fitted, in which the fin is arranged on a first mounted shaft journal, and the balance weight is arranged on a second shaft journal, wherein the first journal and the second journal are moveable in semi-circular grooves, and the fin and balance weight are moveable in opposite radial directions,
wherein rotation of the disc in a first direction causes the at least one fin to be deployed from the projectile and the at least one balance weight to be displaced in towards the center of the projectile, and wherein rotation of the disc in a second direction, an opposite direction to the first direction, causes the at least one fin to be retracted into the projectile and the at least one balance weight to be displaced out from the center of the projectile.

6. The fin deployment mechanism for a rotationally stabilized projectile according to claim 5, wherein the semi-circular grooves comprises a first semi-circular, milled-out groove arranged on a first side of the rotatable disc and a second semi-circular, milled-out groove arranged on a second side of the rotatable disc.

7. The fin deployment mechanism for a rotationally stabilized projectile according to claim 6, wherein the first shaft journal is moveable in a first semi-circular, milled-out groove on the first side of the rotatable disc.

8. The fin deployment mechanism for a rotationally stabilized projectile according to claim 6, wherein the second shaft journal is moveable in the second semi-circular, milled-out groove on the second side of the rotatable disc.

9. The fin deployment mechanism for a rotationally stabilized projectile according to claim 6, wherein the first semi-circular, milled-out groove for the first shaft journal for the fin and the second semi-circular, milled-out groove for the second shaft journals for the balance weights are configured to balance forces during retraction and deployment of the fins.

10. The fin deployment mechanism for a rotationally stabilized projectile according to claim 5, further comprising a lower mounting disc arranged with at least one lower groove and an mounting disc arranged with at least one upper groove.

11. The fin deployment mechanism for a rotationally stabilized projectile according to claim 10, wherein the first shaft journal and the second shaft journal is arranged to run in the lower groove on a lower mounting disc and the upper groove on an upper mounting disc, respectively.

12. The fin deployment mechanism for a rotationally stabilized projectile according to claim 11, wherein the upper mounting disc is disposed on the rotatable disc, and the rotatable disc is disposed on the upper mounting disc around the center of the projectile.

13. A method for energy-efficient deployment and retraction of fins on a rotating projectile, the method comprising:
arranging at least one fin in a deployable and retractable manner on the projectile, and
fitting the at least one fin to at least one balance weight, wherein when the at least one fin is displaced out from a center of the projectile, upon deployment of the at least one fin, the balance weight is displaced in towards the center of the projectile,
wherein when the at least one fin is displaced in towards the center of the projectile, upon retraction of the at least one fin, the at least one balance weight is displaced out from the center of the projectile, and the displacement of the at least one fin comprises a translation in a radial direction of the projectile, and an opposite displacement of the at least one weight is a translation in the radial direction of the projectile,
wherein a radial deployment force acting on the fin is compensated with an equally large and equidirectional radial force acting on the balance weight.

14. The method for energy-efficient deployment and retraction of fins according to claim 13, wherein a deployment force acting on the at least one fin is compensated with an equally large and equidirectional radial force acting on the at least one balance weight by virtue of an increase of a mass of the at least one balance weight when the at least one balance weight is displaced in towards the center of the projectile and the mass of the at least one balance weight decreases when the at least one balance weight is displaced out from the center of the projectile.

15. The method for energy-efficient deployment and retraction of fins according to claim 13, further comprising:
fitting the at least one fin and the at least one balance weight to a rotatable disc comprising grooves, in which the grooves displace the at least one fin and the at least one balance weight when the disc is rotated,
compensating the deployment force acting on the at least one fin with an equally large and equidirectional radial force acting on the at least one balance weight by balancing a torque contribution on the rotatable disc from the at least one fin and the at least one balance weight, when the projectile is subjected to centrifugal acceleration, with the groove which displaces the at least one balance weight and the grooves which displace the fins.

* * * * *